(12) United States Patent
Tenorio

(10) Patent No.: US 8,571,945 B2
(45) Date of Patent: *Oct. 29, 2013

(54) PRE-QUALIFYING SELLERS DURING THE MATCHING PHASE OF AN ELECTRONIC COMMERCE TRANSACTION

(75) Inventor: Manoel Tenorio, Mountain View, CA (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,959

(22) Filed: Dec. 7, 2011

(65) Prior Publication Data
US 2012/0310780 A1     Dec. 6, 2012

Related U.S. Application Data

(60) Division of application No. 11/872,940, filed on Oct. 16, 2007, now Pat. No. 8,326,699, which is a continuation of application No. 09/858,322, filed on May 15, 2001, now Pat. No. 7,349,868.

(51) Int. Cl.
   *G06Q 30/00*     (2012.01)
(52) U.S. Cl.
   USPC ... 705/26.5; 705/26.1; 705/26.35; 705/26.62; 705/26.64; 705/27.1
(58) Field of Classification Search
   None
   See application file for complete search history.

(56) References Cited

U.S. PATENT DOCUMENTS

| | | | |
|---|---|---|---|
| 3,961,164 A | 6/1976 | Reed et al. | 235/61.12 |
| 5,347,632 A | 9/1994 | Filepp et al. | |
| 5,551,027 A | 8/1996 | Choy et al. | |
| 5,564,043 A | 10/1996 | Siefert | 395/600 |
| 5,642,419 A | 6/1997 | Rosen | 380/23 |
| 5,664,115 A | 9/1997 | Fraser | |
| 5,694,546 A | 12/1997 | Reisman | 395/200.9 |
| 5,721,832 A | 2/1998 | Westrope et al. | |

(Continued)

FOREIGN PATENT DOCUMENTS

| AU | 9962723 | 5/2000 |
|---|---|---|
| WO | 0025190 | 4/2000 |

OTHER PUBLICATIONS

Bakos, Yannis, The Emerging Role of Electronic Marketplaces on the Internet, Aug. 1998, Communications of the ACM, vol. 41 Issue 8, pp. 35-42.

(Continued)

*Primary Examiner* — Bradley B Bayat
(74) *Attorney, Agent, or Firm* — Jackson White, PC; Steven J. Laureanti

(57) ABSTRACT

A process for providing seller pre-qualification during the matching phase of an electronic commerce transaction includes a directory structure comprising multiple hierarchically organized product classes, each product class categorizing multiple products and defining one or more attributes of the products categorized in the product class. The process also includes one or more pointers for each product class, each pointer identifying a seller database in which product data enabling a product transaction is stored for products categorized in the product class. The process further includes a search interface configured to communicate a search query for product data only to one or more seller databases associated with sellers having seller attribute values matching the specified seller attribute criteria, these seller databases being identified by the one or more pointers associated with the selected product class.

16 Claims, 4 Drawing Sheets

(56) References Cited

U.S. PATENT DOCUMENTS

| | | |
|---|---|---|
| 5,727,129 A | 3/1998 | Barrett et al. |
| 5,777,608 A | 7/1998 | Lipovski et al. |
| 5,790,677 A | 8/1998 | Fox et al. .................... 380/24 |
| 5,870,473 A | 2/1999 | Boesch et al. ................ 580/21 |
| 5,918,229 A | 6/1999 | Davis et al. |
| 5,926,797 A | 7/1999 | Goodwin, III |
| 5,935,207 A | 8/1999 | Logue et al. |
| 5,963,134 A | 10/1999 | Bowers et al. |
| 5,970,471 A | 10/1999 | Hill |
| 5,983,309 A | 11/1999 | Atsatt et al. |
| 5,987,233 A | 11/1999 | Humphrey |
| 5,991,115 A | 11/1999 | Chainer et al. |
| 6,006,218 A | 12/1999 | Breese et al. |
| 6,016,493 A | 1/2000 | Burrows |
| 6,029,195 A | 2/2000 | Herz |
| 6,038,668 A | 3/2000 | Chipman et al. |
| 6,049,673 A | 4/2000 | McComb et al. ............ 395/712 |
| 6,078,891 A | 6/2000 | Riordan et al. |
| 6,081,840 A | 6/2000 | Zhao |
| 6,094,680 A | 7/2000 | Hokanson |
| 6,101,515 A | 8/2000 | Wical et al. |
| 6,105,134 A | 8/2000 | Pinder et al. ................. 713/170 |
| 6,128,600 A | 10/2000 | Imamura et al. |
| 6,128,624 A | 10/2000 | Papierniak et al. |
| 6,144,996 A | 11/2000 | Starnes et al. |
| 6,154,738 A | 11/2000 | Call |
| 6,189,003 B1 | 2/2001 | Leal |
| 6,189,043 B1 | 2/2001 | Buyukkoc et al. |
| 6,192,131 B1 | 2/2001 | Geer, Jr. et al. ............... 380/283 |
| 6,199,082 B1 | 3/2001 | Ferrel et al. .................... 707/522 |
| 6,212,512 B1 | 4/2001 | Barney et al. |
| 6,236,975 B1 | 5/2001 | Boe et al. ........................ 705/7 |
| 6,236,978 B1 | 5/2001 | Tuzhilin |
| 6,271,846 B1 | 8/2001 | Martinez et al. |
| 6,285,366 B1 | 9/2001 | Ng et al. |
| 6,286,002 B1 | 9/2001 | Axaopoulos et al. |
| 6,289,382 B1 | 9/2001 | Bowman-Amuah |
| 6,324,522 B2 | 11/2001 | Peterson et al. |
| 6,327,574 B1 | 12/2001 | Kramer et al. |
| 6,334,131 B2 | 12/2001 | Chakrabarti et al. |
| 6,336,112 B2 | 1/2002 | Chakrabarti et al. |
| 6,336,910 B1 | 1/2002 | Ohta et al. ..................... 604/6.13 |
| 6,341,280 B1 | 1/2002 | Glass et al. |
| 6,343,287 B1 | 1/2002 | Kumar et al. |
| 6,356,899 B1 | 3/2002 | Chakrabarti et al. |
| 6,366,910 B1 | 4/2002 | Rajaraman et al. |
| 6,415,320 B1 | 7/2002 | Hess et al. |
| 6,460,038 B1 | 10/2002 | Khan et al. |
| 6,466,240 B1 | 10/2002 | Maslov |
| 6,466,918 B1 | 10/2002 | Spiegel et al. |
| 6,470,344 B1 | 10/2002 | Kothuri et al. |
| 6,476,832 B1 | 11/2002 | Park |
| 6,477,533 B2 | 11/2002 | Schiff et al. |
| 6,489,968 B1 | 12/2002 | Ortega et al. |
| 6,490,567 B1 | 12/2002 | Gregory |
| 6,490,619 B1 | 12/2002 | Byrne et al. |
| 6,516,350 B1 | 2/2003 | Lumelsky et al. |
| 6,532,481 B1 | 3/2003 | Fassett, Jr. .................... 707/203 |
| 6,553,364 B1 | 4/2003 | Wu |
| 6,578,014 B1 * | 6/2003 | Murcko, Jr. .................... 705/80 |
| 6,581,072 B1 | 6/2003 | Mathur et al. |
| 6,591,252 B1 | 7/2003 | Young |
| 6,606,744 B1 | 8/2003 | Mikurak |
| 6,708,161 B2 | 3/2004 | Tenorio et al. |
| 6,745,177 B2 | 6/2004 | Kepler et al. |
| 6,763,356 B2 | 7/2004 | Borchers |
| 6,775,655 B1 | 8/2004 | Peinado et al. |
| 6,778,991 B2 | 8/2004 | Tenorio .......................... 707/10 |
| 6,868,400 B1 * | 3/2005 | Sundaresan et al. ............ 705/37 |
| 6,963,867 B2 | 11/2005 | Ford et al. |
| 6,983,276 B2 | 1/2006 | Tenorio |
| 7,076,453 B2 | 7/2006 | Jammes et al. |
| 7,127,416 B1 | 10/2006 | Tenorio |
| 7,263,515 B1 | 8/2007 | Tenorio et al. |
| 7,349,879 B2 | 3/2008 | Alsberg et al. |
| 7,546,254 B2 | 6/2009 | Bednarek |
| 7,606,736 B2 * | 10/2009 | Martineau et al. ............ 705/26.8 |
| 7,739,400 B2 | 6/2010 | Lindbo et al. |
| RE41,476 E * | 8/2010 | Muehleck et al. ............ 700/107 |
| 2001/0014868 A1 | 8/2001 | Herz et al. |
| 2001/0032162 A1 | 10/2001 | Alsberg et al. ................. 705/37 |
| 2001/0034814 A1 | 10/2001 | Rosenzweig |
| 2001/0044751 A1 | 11/2001 | Pugliese, III et al. |
| 2001/0051927 A1 | 12/2001 | London et al. |
| 2002/0026386 A1 | 2/2002 | Walden |
| 2002/0032597 A1 | 3/2002 | Chanos |
| 2002/0046187 A1 | 4/2002 | Vargas et al. |
| 2002/0111870 A1 * | 8/2002 | Chinnappan et al. ........... 705/26 |
| 2002/0123955 A1 | 9/2002 | Andreski et al. |
| 2002/0169626 A1 | 11/2002 | Walker et al. |
| 2003/0033205 A1 | 2/2003 | Nowers et al. |
| 2003/0149934 A1 | 8/2003 | Worden |
| 2008/0228657 A1 * | 9/2008 | Nabors et al. ................... 705/80 |

OTHER PUBLICATIONS

AT&L Knowledge Sharing System "Ask a Professor—Question & Answer Detail," 2 pages.

\* cited by examiner

FIG. 3

| PID | PRODUCT TYPE | MANUFACTURER | INK COLOR | TIP SIZE | CURRENCIES ACCEPTED | ... | PRICE |
|---|---|---|---|---|---|---|---|
| 23 | BALL POINT | ABC | BLUE | MEDIUM | US DOLLARS | ... | 0.12 |
| 29 | BALL POINT | ABC | BLACK | MEDIUM | US DOLLARS | ... | 0.12 |
| 56 | BALL POINT | XYZ | BLACK | MEDIUM | US DOLLARS | ... | 0.13 |
| 98 | BALL POINT | XYZ | GREEN | MEDIUM | US DOLLARS | ... | 0.13 |
| . | . | . | . | . | . | ... | . |
| . | . | . | . | . | . | ... | . |
| 12 | FELT TIP | XYZ | BLACK | BROAD | US DOLLARS | ... | 0.17 |
| 16 | FELT TIP | ABC | BLACK | BROAD | US DOLLARS | ... | 0.18 |
| 56 | FELT TIP | ABC | RED | FINE | US DOLLARS | ... | 0.16 |
| 123 | FELT TIP | XYZ | RED | FINE | US DOLLARS | ... | 0.16 |
| . | . | . | . | . | . | ... | . |
| . | . | . | . | . | . | ... | . |
| 2 | ROLLER BALL | XYZ | BLUE | FINE | US DOLLARS | ... | 0.25 |
| 59 | ROLLER BALL | XYZ | BLACK | FINE | US DOLLARS | ... | 0.25 |
| 143 | ROLLER BALL | XYZ | BLACK | MEDIUM | US DOLLARS | ... | 0.22 |
| 456 | ROLLER BALL | ABC | RED | EXTRA FINE | US DOLLARS | ... | 0.29 |
| . | . | . | . | . | . | ... | . |
| . | . | . | . | . | . | ... | . |

PRE-QUALIFYING SELLERS DURING THE MATCHING PHASE OF AN ELECTRONIC COMMERCE TRANSACTION

CLAIM OF PRIORITY

This application is a divisional of U.S. patent application Ser. No. 11/872,940, filed on Oct. 16, 2007 and entitled "Pre-Qualifying Sellers During the Matching Phase of an Electronic Commerce Transaction," which is a continuation of U.S. patent application Ser. No. 09/858,322, filed on May 15, 2001, now U.S. Pat. No. 7,349,868 and entitled "Pre-Qualifying Sellers During the Matching Phase of an Electronic Commerce Transaction." U.S. patent application Ser. No. 11/872,940 and U.S. Pat. No. 7,349,868 are commonly assigned to the assignee of the present application. The disclosure of related U.S. patent application Ser. No. 11/872,940 and U.S. Pat. No. 7,349,868 are hereby incorporated by reference into the present disclosure as if fully set forth herein.

BACKGROUND

1. Technical Field of the Invention

This invention relates to electronic commerce and more particularly to prequalifying sellers during the matching phase of an electronic commerce transaction.

2. Background of the Invention

Due to the ever-increasing popularity and accessibility of the Internet as a medium of communication, the number of business transactions conducted using the Internet is also increasing, as is the number of buyers and sellers participating in electronic marketplaces providing a forum for these transactions. In addition, the globalization of such marketplaces has resulted in an increased number of seller attributes that buyers may need to consider when determining which sellers best suit their needs. The majority of electronic commerce ("e-commerce") transactions occur when a buyer determines a need for a product, identifies a seller that provides that product, and accesses the seller's web site to arrange a purchase of the product. If the buyer does not have a preferred seller or if the buyer is purchasing the product for the first time, the buyer will often perform a search for a number of sellers that offer the product and then access numerous seller web sites to determine which seller offers certain desired product features at the best price and under the best terms for the buyer. The matching phase of an e-commerce transaction (matching the buyer with a particular seller) is often inefficient because of the large amount of searching involved in finding a product and because once a particular product is found, the various offerings of that product by different sellers may not be easily compared.

SUMMARY OF THE INVENTION

According to the present invention, disadvantages and problems associated with the matching phase of e-commerce transactions have been substantially reduced or eliminated.

In one embodiment of the present invention, a system providing seller prequalification during the matching phase of an electronic commerce transaction includes a directory structure comprising multiple hierarchically organized product classes, each product class categorizing multiple products and defining one or more attributes of the products categorized in the product class. The system also includes one or more pointers for each product class, each pointer identifying a seller database in which product data enabling a product transaction is stored for products categorized in the product class. Each seller database is associated with a seller having values for one or more seller attributes. The system further includes a search interface operable to communicate, in response to selection of a product class and specification of one or more seller attribute criteria, a search query for product data only to one or more seller databases associated with sellers having seller attribute values matching the specified seller attribute criteria, these seller databases being identified by the one or more pointers associated with the selected product class.

In another embodiment, a system providing seller pre-qualification during the matching phase of an electronic commerce transaction includes a directory structure comprising multiple hierarchically organized product classes, each product class corresponding to multiple products having in common one or more product attributes, each product in a product class being defined by a product attribute value for each product attribute for the product class, each product being further defined by a seller attribute value for each of one or more seller attributes, the seller attribute values for a product being associated with a particular seller from which the product may be purchased. The system also includes a search interface operable to communicate to one or more seller databases a search query for product data in response to selection of a product class, specification of one or more product attribute criteria, and specification of one or more seller attribute criteria. The system further includes a presentation interface operable to communicate search results in response to the search query, the search results comprising product data for one or more products within the selected product class with product attribute values matching the specified product attribute criteria and with seller attribute values matching the specified product attribute criteria.

Particular embodiments of the present invention may provide one or more important technical advantages. For example, certain embodiments may allow buyers to pre-qualify sellers based on seller attribute values in addition to product attribute values, which may become an increasingly important search tool as the number of sellers participating in electronic marketplaces and the size of product catalogs increase. Sellers may be described in terms of a supplier ontology that includes fields for seller attribute values, and buyers may electronically search for sellers matching certain seller attribute criteria as well as products matching certain product attribute criteria. Sellers not matching seller attribute criteria provided by a buyer may be excluded from the search results presented to the buyer (or even the search itself), thereby reducing the need for the buyer to individually contact sellers after obtaining the results of a product query or manually cull such results to identify the most suitable seller for the buyer. Pre-qualifying sellers may accordingly simplify and speed up the matching phase of e-commerce transactions in which a buyer searches for and identifies a suitable product and/or a suitable seller.

Systems and methods incorporating one or more of these or other technical advantages are well suited for modem e-commerce environments. Other technical advantages may be readily apparent to those skilled in the art from the following figures, descriptions, and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example table within a seller database;

DESCRIPTION OF EXAMPLE EMBODIMENTS

Figure 1:
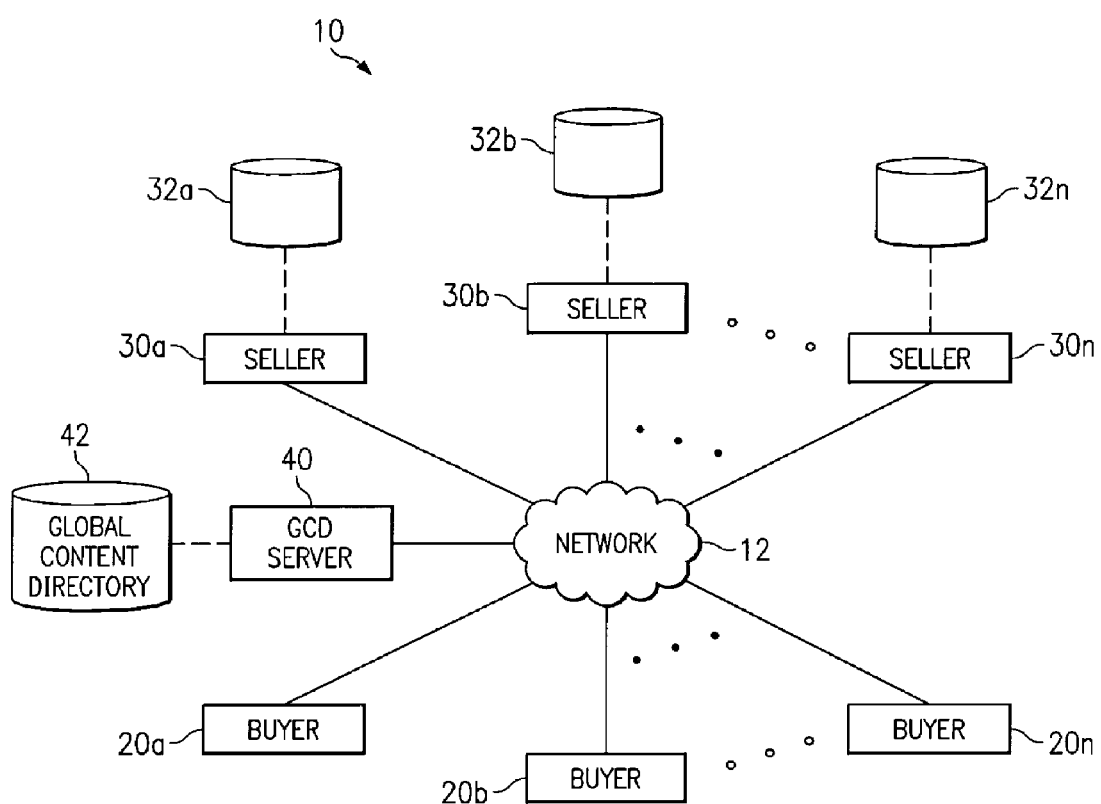
FIG. 1 illustrates an example electronic commerce system.

FIG. 1 illustrates an example system 10 that includes a network 12 coupling buyers 20, sellers 30, and a global content directory (GCD) server 40. System 10 enables electronic commerce ("e-commerce") transactions between buyers 20 and sellers 30 through the use of a GCD 42 supported by GCD server 40. GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers 20 and sellers 30 in the world, the present invention potentially includes all of these buyers 20 and sellers 30 as buyers 20 and sellers 30 associated with system 10. However, the use of the term "global" should not be interpreted as a geographic limitation necessarily requiring that GCD 42 provide directory services to buyers 20 and sellers 30 around the world (or from any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or another entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller offering the lowest price), and contact that seller 30 to enter the transactional phase. During the transactional phase, buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. Without the present invention, buyer 20 may have to access numerous seller web sites to identify the most suitable seller 30 offering the desired product. Sellers 30 may each provide one or more databases 32, such as relational databases, that include product data identifying the products available from sellers 30 and various attributes of the products. Each database 32 may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer 20 may wish to obtain. Therefore, the global database would include the combined contents of every database 32 associated with every seller 30. However, such a global database would have many problems. For example, the sheer size of the database would make it difficult to search and thus the database would suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is GCD 42. GCD 42 is a universal directory of the contents of multiple seller databases 32 (and potentially all seller databases 32). GCD 42 may be implemented using one or more servers 40 or other computers located at one or more locations. Most or all of the content in these seller databases 32 remains stored in databases 32, but all of this content is preferably accessible using GCD 42. Therefore, like the global database described above, GCD 42 provides buyers 20 access to product data relating to a multitude of products, but unlike the global database, GCD 42 does not attempt to store all of this data in one enormous database.

GCD 42 provides a directory of products using a directory structure in which products are organized using a hierarchical classification system. A buyer 20 may navigate or search the directory to find a particular product and product data associated with the product. After a certain point of specificity, the data associated with a product may actually be stored in and obtained by GCD 42 from a seller database 32. However, the requested data may be transparently provided to buyer 20 such that all of the product data may appear to buyer 20 as being included in GCD 42. Although product data has primarily been described as being stored in seller databases 32, the present invention contemplates product data being stored in any suitable manner and being retrieved from any suitable sources. For example, system 10 may include a central database that contains product data that may be combined with product data from one or more seller databases 32.

In addition to product data, GCD 42 may provide buyers 20 access to seller data relating to products available from sellers 30. Reference to "data" is meant to include product data (meaning information reflecting values for certain attributes of a product), seller data (meaning information reflecting values for certain seller attributes), or both product data and seller data, where appropriate. Seller data for a seller 30 may, as described more fully below, provide information regarding seller 30 that may be important to a buyer 20 in choosing to ultimately purchase from or otherwise collaborate with seller 30. Sellers 30 may be described in terms of a supplier ontology that includes fields for seller attribute values, and buyers 20 may electronically search for sellers 30 matching certain seller attribute criteria as well as products matching certain product attribute criteria. Sellers 30 not matching seller attribute criteria provided by a buyer 20 may be excluded from the search results presented to buyer 20 (or even the search itself), thereby reducing the need for the buyer 20 to individually contact sellers 30 after obtaining the results of a product query or manually cull such results to identify the most suitable seller 30 for buyer 20.

Figure 2:
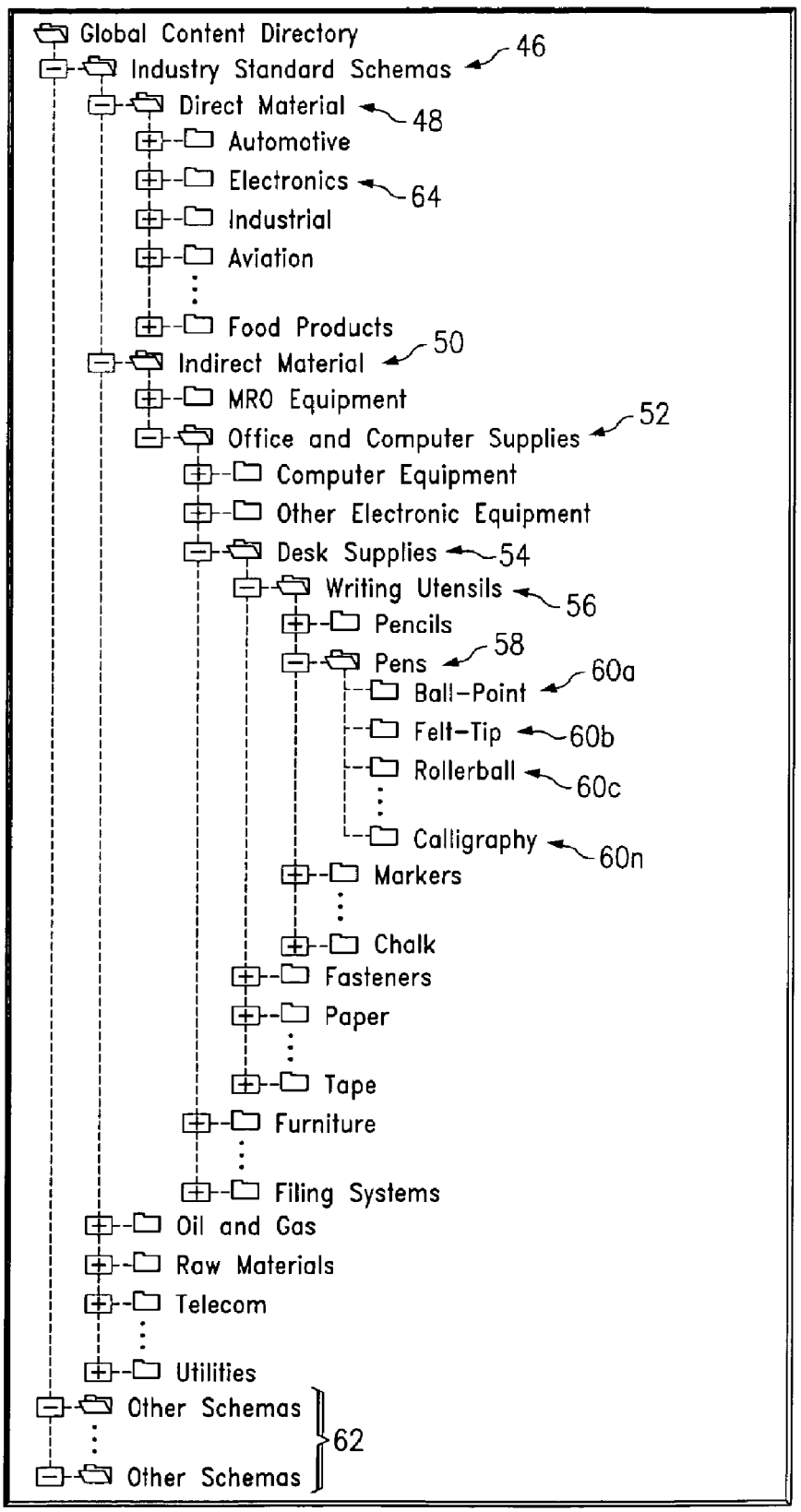
FIG. 2 illustrates an example directory structure of an example global content directory.

FIG. 2 illustrates an example directory structure 44 of an example GCD 42. Products categorized in GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to value is meant to include any appropriate data reflecting an instance of a product attribute or a seller attribute. Product attribute values and seller attribute values may include numbers, letters, figures, characters, symbols, or other suitable information for describing a product or a seller 30, respectively. In one embodiment, a product ontology may be divided into entry-required attributes (meaning attributes for which a value has to be provided) and entry-optional attributes (meaning attributes for which a value is optional), and these categories may be further divided into commercial features and design features.

In addition to a taxonomy and product ontologies, a schema may include a set of attributes for each seller 30 (which may be referred to as a "seller ontology"). Such attributes may include geographic restrictions (such as served geographic markets), currencies accepted by each seller 30, collaboration tools accepted by each seller 30, terms and conditions inherent to each seller 30, contract terms accepted by each seller 30, types of contracts accepted by each seller 30, levels of buyer credit required by each seller 30, and any other suitable seller attributes. Similar to a products within a product class, sellers 30 offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60*a*-60*n* ("n" indicating that any number of classes 60 may be included in pens class 58). Each of classes 50, 52, 54, 56, 58, and 60 is located at a different level of directory structure 44. A class at any level in directory structure 44 may include one or more sub-classes, those sub-classes may include one or more subclasses, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60*b* form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). As another example, a hospital supplies schema 62 may include a set of product classes corresponding to different hospital facilities, allowing a hospital supplies buyer to search for products typically associated with emergency rooms in one product class and products typically associated with intensive care units in another. Therefore, the same product may be included in multiple schemas 62. These alternative schemas may be included in directory structure 44 and may be stored as a part of or separate from GCD 42.

A buyer 20 may navigate through directory structure 44 by expanding or collapsing various classes as desired. For example, FIG. 2 illustrates an expansion of certain classes of directory structure 44 to reach a felt-tip pen class 60*b*. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pins having medium tips. Alternatively, if buyer 20 navigates to the end of a branch of directory structure 44, such as felt-tip pen class 60*b*, GCD 42 may then enable buyer 20 to search for such pens that have blue ink and medium tips (which may reach the same result as the search above).

Buyer 20 may also search for sellers 30 matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers 30 matching certain seller attribute values in any appropriate manner. In one embodiment, for example, buyer 20 provides search criteria including both criteria for product attributes and for seller attributes (search criteria may instead be generated automatically, in whole or in part, as described below), and server 40 searches for products that match the product attribute criteria and are offered by sellers 30 matching the seller attribute criteria. (Where appropriate, "criteria" and "values" may be used interchangeably herein.) Alternatively, server 40 may search for sellers 30 matching the seller attribute criteria, "deselect" those databases 32 corresponding to sellers 30 not matching the criteria, and then search those databases 32 that have not been deselected for products matching the product attribute criteria. In another embodiment, buyer 20 provides only product attribute criteria, and server 40 limits its search for products matching the product attribute criteria to databases 32 associated with sellers 30 known to match seller attribute criteria that buyer 20 may want, according to a buyer profile or otherwise. As described more fully below, server 40 may determine whether a seller 30 matches such criteria by accessing a buyer profile that contains a record of prequalified sellers 30 for buyer 20.

In one embodiment, as described above, product data (at least product data more detailed than data provided by a taxonomy) and seller data are not stored in GCD 42, but are stored in databases 32. For example, a seller 30 may maintain a relational database 32 that includes a plurality of tables containing product attribute values for a variety of products and attribute values for seller 30 for each product, a set of products, or all of the products offered by seller 30. Product data and seller data may be integrated into one or more tables or may be segregated into different tables. Moreover, product data and seller data for a seller 30 may be stored in the same or separate databases. For example, as described above, product data for seller 30 may be stored in seller database 32 while seller data for seller 30 may be stored in a central database accessible to server 40 that may contain seller data for a number of sellers 30. One or more pointers may be associated with each class to identify the location of one or more databases 32 that include product data and/or seller data for products contained in that class or to identify particular data in databases 32. Therefore, GCD 42 may execute a search for products in databases 32 identified by a pointer corresponding to a user-selected class (the class may instead be selected automatically in an appropriate manner). GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP), which enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60b, a search performed by buyer 20 (or by GCD 42 on behalf of buyer 20) from felt-tip pens class 60b may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by GCD 42 to only include felt-tip pens within that database 32. Buyer 20 may also identify additional product attribute values and/or seller attribute values as additional search criteria.

When GCD 42 has performed a search of the databases 32 identified by a pointer or pointers associated with a class that buyer 20 has selected (or that has been selected automatically), GCD 42 may return product data and possibly seller data associated with one or more products matching the search criteria. (Alternatively, search results may be communicated directly to buyer 20 from databases 32.) GCD 42 may integrate the product data and possibly seller data resulting from the search into directory structure 44 so that the data appears to buyer 20 as being part of GCD 42. GCD 42 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller 30 matching certain seller attribute values using GCD 42 and thus eliminate or reduce the need for buyer 20 to individually search numerous seller databases 32 to find the desired product available from a suitable seller 30. GCD 42 provides access to product and seller data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product and seller data relating to a product, and then communicate with an appropriate database 32 through GCD server 40 or otherwise. Such access to vast numbers of products is provided without the requirement that all data about the products and associated sellers 30 be stored in a global database (which would greatly decrease performance). Instead, this data may be stored in seller databases 32 that can be readily accessed from GCD 42.

One problem that may be associated with the use of various seller databases 32 is that databases 32 may include product data about the same class of product (for example, felt-tip pens), but may identify products of that class using different attribute values, may use different names for the same product attribute value, and/or may quantify or distinguish product attribute values differently (using different units of measurement, for example). The same may be true for seller data that may be contained in databases 32. Some of these issues may be solved using translation mechanisms that convert the data into a uniform format used by GCD 42. In addition, sellers 30 may create a database 32 (or modify an existing database 32) to conform to a uniform standard in anticipation of database 32 being used in association with GCD 42. If a database 32 does not completely conform to such a uniform standard, the database 32 may be partially integrated into GCD 42, but some products in the database 32 may not be properly identified and presented to a buyer 20 using GCD 42. Therefore, through translation mechanisms and market pressure to be included and fully integrated into a global directory of products, seller databases 32 may conform to the uniform standard used by GCD 42 to identify the particular class or classes of products included in the databases 32.

FIG. 3 illustrates an example table 150 that may be included in a seller database 32. Database 32 may include one or more tables 150, and each table 150 may contain data relating to one or more products. For example, example table 150 includes data relating to different types of pens. Table 150 may also include data for other types of products (for example, other types of office supplies), or such data may be contained in other tables 150 in database 32. Table 150 includes a plurality of columns 152 that each include data relating to a particular product attribute or seller attribute. Although an example number of columns 152 including example product attribute values and seller attribute values are illustrated, it should be understood that any appropriate number and type of product attributes, seller attributes, or other categories of data may be included in table 150. Moreover, as described briefly above, seller data and product data may be segregated into different tables instead of being integrated into the same table as shown in example table 150.

Table 150 also includes a number of rows 154 that may each correspond to a particular product and that each include values for one or more of the product attributes and seller attributes. Each of the values (which may be numeric, textual, or in any other appropriate format, as described above) is located at the intersection of the row 154 associated with a particular product and the column 152 that includes a particular product attribute or seller attribute. Each of these intersections may be referred to as a field or cell 156 of table 150. Where seller data and product data are integrated, each row 154 may contain all of the product data and seller data for the product corresponding to that row 154. Alternatively, there may be a row or set of rows dedicated to seller data that may apply to all products offered by a seller 30 or a subset of all such products. Where seller data and product data are segregated, each row in the seller data table may correspond to a set of seller attribute values that may be linked to a set of one or more products in the product data table such that seller data for a product may be accessed when product data for that product is accessed, and vice versa.

The data in one or more columns 152 of table 150 may be indexed to increase the speed with which database reads may be conducted. For example, the fields 156 of ink color column 152d and tip size column 152e may be indexed so that a database query for a pen having a particular ink color and tip size may be quickly performed. Data in table 150 may be indexed using any appropriate database indexing technique. The typical result of such indexing is that when GCD server 40 or a buyer 20 requests indexed data from a database 32, the associated database management system (or other appropriate interface to database 32) does not have to search through every field 156 in the tables 150 included in database 32 to locate the requested data. Instead, the data may be indexed such that when a query is submitted for products matching certain product attribute values available from sellers 30 matching certain seller attribute values that have been indexed, the database management system already knows the locations of such products in table 150 and may return data associated with these products without searching the entire table 150 or database 32 for the products. For example, if the ink color fields 156 and tip size fields 156 of columns 152d and 152e, respectively, are indexed, the index will typically identify the location of all products having black ink and a medium tip size.

If a query is submitted that also specifies certain values of one or more non-indexed product attributes (for example, a query for pens manufactured by ABC Company, if the manufacturer fields 156 in column 152c are not indexed) and/or seller attributes, then the associated database management system may perform a search of database 32 for products that include the specified values of the non-indexed product attributes and/or seller attributes. However, such a search may be limited to the products already identified (using the index) as including specified values of indexed attributes (for example, pens having black ink and a medium tip) and/or seller attributes that are also included in the search. Therefore, the amount of time required to perform the search may be reduced even though one or more of the product attribute values or seller attribute values that are searched for are not indexed.

Figure 4:
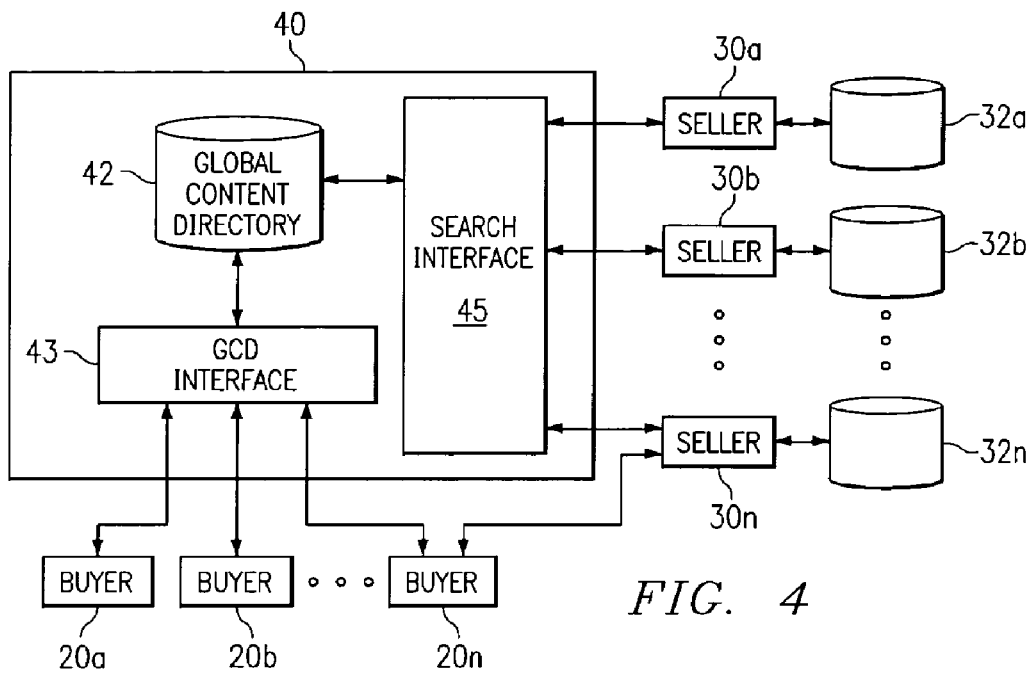
FIG. 4 illustrates an example electronic commerce system in further detail.

FIG. 4 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access server 40 and use a GCD interface 43 to search or navigate GCD 42 and/or seller databases 32. Information may be communicated between buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product buyer 20 desires, buyer 20 may then request a listing of products in that class matching certain product attribute values available from sellers 30 matching certain seller attribute values. For example, if buyer 20 is browsing felt-tip pens class 60b, buyer 20 may request all products in class 60b (felt-tip pens) that have red ink and a fine tip and that are sold by a seller 30 located in the United States.

A search interface 45, or any other appropriate component of GCD server 40, may facilitate such a request by searching or requesting searches of seller databases 32 identified by one or more pointers associated with felt-tip pens class 60b, as described above. Search interface 45 may provide buyer 20 a search form in which to enter one or more search criteria. The types of search criteria that may be used may be identified in the search form or buyer 20 may be allowed to perform a general search of databases 32 for certain terms. For example, search interface 45 may provide buyer 20 with a search form tailored for class 60b that includes fields where buyer 20 can specify a desired ink color, tip thickness, or any other appropriate product-related or seller-related criteria. In one embodiment, the fields of the search form correspond to some or all of the product attributes within the product ontology and some or all of the seller attributes within the seller ontology corresponding to the product class that has been selected, and buyer 20 may enter values for the product attributes and seller attributes in the corresponding search form fields. In lieu of a search form, search interface 45 may instead provide a single field where buyer 20 can enter in desired search terms, such as "red" and "fine" (multiple search terms may be entered using Boolean operators or any other appropriate technique).

As briefly described above, search interface 45, or any other appropriate component of GCD server 40, may also facilitate search requests by accessing a buyer profile for buyer 20 containing information compiled from previous search requests made by buyer 20 or previous e-commerce transactions involving buyer 20. Such information may also be provided by buyer 20 specifically for creating or updating the profile for buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to facilitate selection of a product class for buyer 20. For example, a profile may indicate what products buyer 20 may want to purchase at certain times (daily, weekly, monthly, yearly, etc.) and select the appropriate product class for buyer 20 or suggest or otherwise direct buyer 20 to that product class. A profile may also indicate what product classes buyer 20 typically searches or purchases products from. In this case, search interface 45 may present buyer 20 a list of frequently searched classes from which buyer 20 may select a class or, alternatively, select a class automatically for buyer 20 based on the profile for buyer 20. In another embodiment, search interface 45 may access the profile for buyer 20 to automatically generate search criteria, such as product attribute values and seller attribute values, for a search.

Search interface 45 may also access the profile for buyer 20 to limit its search for products matching product attribute values provided by buyer 20 (or generated automatically) to databases 32 associated with sellers 30 known to match seller attribute values that buyer 20 may want. For example, buyer 20 may provide search criteria including product attribute values, and search interface 45 may access the seller list in the buyer profile for buyer 20 to limit its search for products matching those attribute values to databases 32 associated with sellers 30 appearing on the list. In this way, the buyer profile may provide a "private" catalog for buyer 20, pointing to databases 32 associated with sellers 30 with which buyer 20 may collaborate. Buyer profiles may be stored in any appropriate manner. For example, server 40 may include one or more databases containing buyer profiles accessible to search interface 45 or other appropriate components of GCD server 40 that may be updated as needed. In addition to accessing buyer profiles to retrieve information, search interface 45 or other appropriate components of GCD server 40 may also access a buyer profile for a buyer 20 to store information from previous search requests made by buyer 20, previous e-commerce transactions involving buyer 20, or other events or actions on the part of buyer 20.

Based on search criteria provided by buyer 20 or generated automatically (and possibly based on any appropriate attributes of the class from which the search is conducted), search interface 45 may communicate a query to one or more appropriate seller databases 32 requesting that databases 32 each return a listing of all products (including associated product data and seller data) that meet the search criteria. Databases 32 may also return data relating to attribute values that were not included in the search criteria. For example, databases 32 may return a price and availability of products that meet the search criteria even if price and availability were not search criteria. The responses to the queries of databases 32 may be displayed to buyer 20 in any appropriate manner. For example, the products may be listed in order of relevance to the search criteria according to any suitable matching criteria. Furthermore, GCD 42 may reorder the product listing based on a request from buyer 20. For example, buyer 20 may request that the matching products be listed in order from least expensive to most expensive.

Buyer 20 may select a product from the product listing to indicate a desire to initiate a transaction regarding the product, such as a purchase of the product. On such a selection, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer 20 may access the seller 30 using the RID (or network address) and request a transaction regarding the product using the GUID. GCD 42 may even provide a link including a URL of a web site associated with the seller 30 or may provide another appropriate method for buyer 20 to be connected to seller 20. Although only a single example arrow (between buyer 20n and seller 30n) is shown to illustrate communication between buyers 20 and sellers 30, it should be understood that any buyer 20 may communicate with any seller 30 to conduct appropriate transactions.

Since GCD 42 is able to communicate with databases 32 to identify certain products requested by a buyer 20, product data and/or seller data categorized in GCD 42 does not have to be stored at GCD 42. Furthermore, since buyer 20 may communicate directly with an appropriate seller 30 after selecting a product identified by GCD 42 and being given location information for a seller 30 of the product, GCD 42 does not have to maintain resources to support transactions relating to the product. Therefore, by linking a directory of products to databases 32 containing information about the products, potentially every product in the world may be made available to a buyer 20 without having to centrally store information about all such products (which would be infeasible due to the immense amount of data that would have to be stored, the difficulties associated with keeping the data up to date, and other problems).

Figure 5:
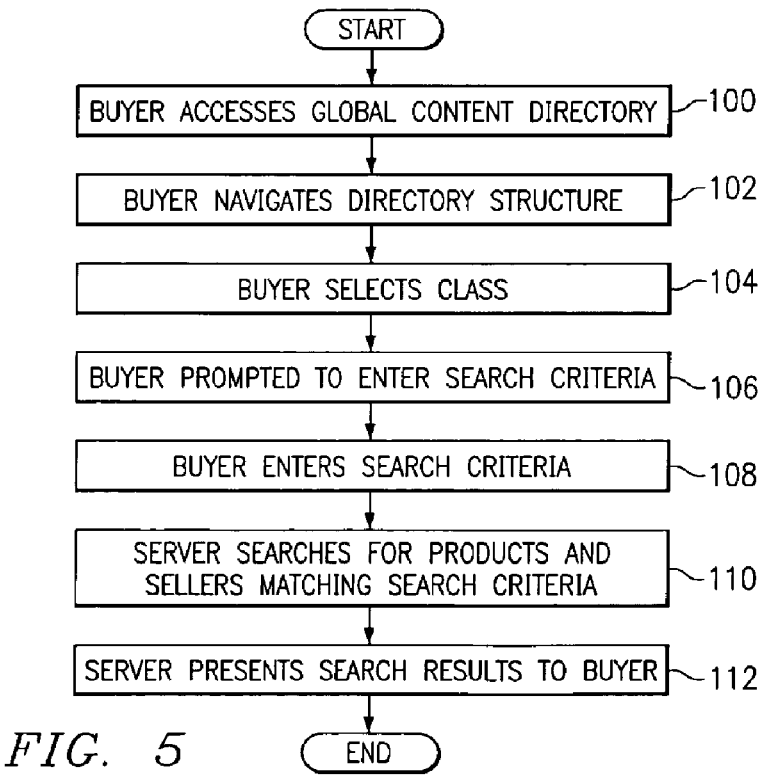
FIG. 5 illustrates an example method for pre-qualifying sellers.

FIG. 5 illustrates an example method for pre-qualifying sellers 30 during the matching phase of an e-commerce transaction. The method begins at step 100, where buyer 20 accesses GCD 42 through GCD interface 43. As described above, buyer 20 may access GCD 42 using a web browser or in any other appropriate manner. Buyer 20 navigates the directory structure 44 at step 102 to a class that is specific enough for buyer 20, as described above. Buyer 20 selects the class at step 104. As described above, a class may instead be selected automatically based on a buyer profile for buyer 20. Buyer 20 may also request a search of a product class appearing in a "frequently searched product classes" list that may be maintained for wherein the results are tabulated and sorted according to price. In this embodiment, buyer 20 may review the first group of results, then request the second group of results, and so on. Accordingly, buyers 20 may electronically search for sellers 30 matching certain seller attribute criteria in addition to products matching certain product attribute criteria, thereby reducing the need for buyers 20 to individually contact sellers 30 after obtaining the results of a product query or manually cull such results to identify the most suitable seller 30 for buyer 20. Thus, the matching phase of e-commerce transactions may be significantly faster and otherwise improved.

Although the present invention has been described with several embodiments, numerous changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. A non-transitory computer-readable medium embodied with software providing seller pre-qualification during the matching phase of an electronic commerce transaction, the software embodied in a computer-readable medium and when executed using one or more computers is configured to:
    make accessible to at least one buyer computer a directory structure comprising a plurality of hierarchically organized product classes, wherein the directory structure is associated with a global content directory server and the global content directory server is coupled with one or more seller databases, each product class categorizing a plurality of products and defining one or more attributes of the products categorized in the product class, one or more pointers being provided for each product class, each pointer identifying a corresponding seller database in which product data enabling a product transaction is stored for products categorized in the product class, each seller database associated with a seller having values for one or more seller attributes; and
    communicate, in response to selection of a product class and specification of one or more seller attribute criteria, a search query for product data only to one or more seller databases associated with sellers having seller attribute values matching the specified seller attribute criteria, these seller databases being identified by the one or more pointers associated with the selected product class.

2. The computer-readable medium of claim 1, wherein a seller attribute is selected from the group consisting of geographic restrictions, currencies accepted, level of buyer credit required, collaboration tools accepted, types of contracts accepted, and contract terms accepted.

3. The computer-readable medium of claim 1, wherein the selection of the product class is made automatically according to a buyer profile for a buyer.

4. The computer-readable medium of claim 1, wherein the specification of the seller attribute criteria is made automatically according to a buyer profile for a buyer.

5. The computer-readable medium of claim 1, wherein the software is further configured to communicate a search query in response to specification of one or more product attribute criteria in addition to selection of a product class and specification of one or more seller attribute criteria.

6. The computer-readable medium of claim 3, wherein seller attribute values for a seller are stored in the associated seller database along with product data.

7. The computer-readable medium of claim 3, wherein the software is further configured to communicate, in response to at least selection of the product class, a search query for product data only to one or more seller databases associated with sellers identified in a buyer profile.

8. The computer-readable medium of claim 7, wherein the buyer profile comprises a list of seller attribute criteria compiled based on one or more previous search requests.

9. The computer-readable medium of claim 7, wherein the buyer profile comprises a list of seller attribute criteria compiled based on one or more previous electronic transactions involving the buyer.

10. The computer-readable medium of claim 7:
    wherein the buyer profile comprises a list of seller attribute criteria; and
    the software is further configured to automatically update the list of sellers at certain time intervals by eliminating from the list sellers not having seller attribute values matching the listed seller attribute criteria and adding to the list sellers having seller attribute values matching the listed seller attribute criteria.

11. A non-transitory computer-readable medium embodied with software providing seller pre-qualification during the matching phase of an electronic commerce transaction, the software embodied in a computer-readable medium and when executed using one or more computers is configured to:
    provide a directory structure comprising a plurality of hierarchically organized product classes, each product class corresponding to a plurality of products having in common one or more product attributes, each product in a product class being defined by a product attribute value for each product attribute for the product class, each product being further defined by a seller attribute value for each of one or more seller attributes, the seller attribute values for a product being associated with a particular seller from which the product may be purchased;
    communicate to one or more seller databases a search query for product data in response to selection of a product class, specification of one or more product attribute criteria, and specification of one or more seller attribute criteria; and
    communicate search results in response to the search query, the search results comprising product data for one or more products within the selected product class with product attribute values matching the specified product attribute criteria and with seller attribute values matching the specified product attribute criteria.

12. The computer-readable medium of Claim 11, wherein a seller attribute is selected from the group consisting of geographic restrictions, currencies accepted, level of buyer credit required, collaboration tools accepted, types of contracts accepted, and contract terms accepted.

13. The computer-readable medium of Claim 11, further comprising communicating, in response to at least selection of the product class, a search query for product data only to one or more seller databases associated with sellers identified in a buyer profile for a buyer.

14. A method of pre-qualifying sellers during the matching phase of an electronic commerce transaction, comprising:
    providing, by a computer, a directory structure comprising a plurality of hierarchically organized product classes, each product class corresponding to a plurality of products having in common one or more product attributes, each product in a product class being defined by a product attribute value for each product attribute for the product class, each product being further defined by a seller attribute value for each of one or more seller attributes, the seller attribute values for a product being associated with a particular seller from which the product may be purchased;

communicating, by the computer, to one or more seller databases a search query for product data in response to selection of a product class, specification of one or more product attribute criteria, and specification of one or more seller attribute criteria; and communicating, by the computer, search results in response to the search query, the search results comprising product data for one or more products within the selected product class with product attribute values matching the specified product attribute criteria and with seller attribute values matching the specified product attribute criteria.

15. The method of Claim 14, wherein a seller attribute is selected from the group consisting of geographic restrictions, currencies accepted, level of buyer credit required, collaboration tools accepted, types of contracts accepted, and contract terms accepted.

16. The method of Claim 14, further comprising communicating, in response to at least selection of the product class, a search query for product data only to one or more seller databases associated with sellers identified in a buyer profile.

* * * * *